United States Patent [19]
Siligoni, deceased et al.

[11] Patent Number: 5,402,484
[45] Date of Patent: Mar. 28, 1995

[54] TELEPHONE CIRCUIT ASSEMBLY

[75] Inventors: Marco Siligoni, deceased, late of Vittuone, Italy, by Maria I. Marcioni, legal representative; Vanni Saviotti, Monza, Italy

[73] Assignee: Maria Laura Marcioni, Vittuone, Italy

[21] Appl. No.: 891,548

[22] Filed: May 29, 1992

[30] Foreign Application Priority Data

Jun. 25, 1991 [IT] Italy ................... MI91A1748

[51] Int. Cl.⁶ ............................................. H04M 19/00
[52] U.S. Cl. ................................... 379/399; 379/373; 379/252; 379/253; 379/254
[58] Field of Search ............... 379/399, 373, 252, 253, 379/254

[56] References Cited

U.S. PATENT DOCUMENTS

| | | | |
|---|---|---|---|
| 4,022,980 | 5/1977 | Kitajewski et al. | 379/252 |
| 4,396,805 | 8/1983 | Wagner | 379/252 |
| 4,524,245 | 6/1985 | Littlefield | 379/373 |
| 4,852,162 | 7/1989 | Taya et al. | 379/399 |
| 4,866,768 | 9/1989 | Sinberg | 379/399 |
| 4,995,111 | 2/1991 | Tojo et al. | 379/373 |
| 5,005,199 | 4/1991 | Dupillier | 379/373 |
| 5,133,006 | 7/1992 | Khvat | 379/399 |
| 5,247,573 | 9/1993 | Reichelt | 379/399 |
| 5,293,420 | 3/1994 | Nagato | 379/252 |

FOREIGN PATENT DOCUMENTS

9117623 11/1991 WIPO ................... 379/399

*Primary Examiner*—James L. Dwyer
*Assistant Examiner*—J. M. Saint-Surin
*Attorney, Agent, or Firm*—Seed and Berry

[57] ABSTRACT

A circuit assembly which includes an interface circuit between a subscriber line and exchange devices of the kind with two amplifiers connected in a bridge configuration between the battery terminals and having a means of detecting the output currents; a supply circuit which includes the exchange battery and a ring generator; a switch-over means for putting the line through the interface circuit or the supply circuit; two bridge resistors which are in series with the line when the latter is connected to the supply circuit and of which one is connected permanently between one of the line terminals and the output of one of the amplifiers, which output is substantially at the potential of one of the battery poles; an additional resistor, having a much higher resistive value than that of the bridge resistors and being connected between the other of the line terminals and the output of the other of the amplifiers; and a processing means within the interface circuit, which includes said detecting means and is effective to isolate the useful signal from the line current, recognize a possible hook-off state, and send a corresponding signal to the exchange devices.

25 Claims, 3 Drawing Sheets

TELEPHONE CIRCUIT ASSEMBLY

TECHNICAL FIELD

This invention relates to telephone circuits, and more particularly, to an electronic subscriber link circuit assembly, i.e., one having an electronic interface between the telephone subscriber line and the telephone exchange, with a circuit for detecting the hook-off condition during the ring step.

BACKGROUND OF THE INVENTION

As is known, a telephone subscriber set, comprising essentially of a speech circuit and a bell connected in parallel to each other, is connected to a telephone exchange by means of a two-wire line. Connected in series to the speech circuit, which would be only closed on hooking off, and serially to the bell, is a capacitor operative to DC uncouple the bell from the line.

A telephone subscriber line is supplied a direct voltage from a source, having an alternate voltage source connected serially thereto, which forms the ring signal generator, when the exchange devices control special line connection contacts to close and issue said ring signals to the subscriber.

The ring signals are sent over the line at predetermined intervals. When the hook-off occurs while a ring signal is being sent, a DC component overlaps the alternate ring current over the line.

With today's telephone exchanges, the hook-off condition is detected by circuit means of an electronic type which sense the presence of direct current on the line due to hooking off, even where it overlaps the alternate current of a possible ring signal. Ring signals usually have a frequency in the 16 to 66 Hz range and voltage RMS values in the 50- to 105-Volt range, that is, much higher values than those of telephone speech signals. However, if the signals are not interrupted directly on hooking off, they are converted, by the speech circuit of the telephone subscriber set, to high-intensity acoustical signals which are harmful to the subscriber's hearing and the set itself. Accordingly, such circuit means are designed to timely sense the hook-off condition and issue an interrupt signal for the ring signals at once to the exchange devices.

Implemented by electronic means are also other functions required for proper operation of the telephone network, such as handling the supply of direct current and sending ring signals, switching from two- to four-wire conversion, providing protection from overvoltages, checking the line operability, and so forth. These functions are performed by a circuit assembly which forms an interface between the telephone exchange control devices and the telephone subscriber line. This is commonly referred to as the electronic subscriber link or SLIC (Subscriber Line Interface Circuit). Most of the circuits of the electronic subscriber link are integrated to few, usually two, monolithic IC devices. The generator of ring signals is in some instances incorporated to one of the integrated circuits, and in some other instances, is a discrete component serving, as a rule, all of the subscriber lines to the exchange. This invention can be advantageously applied to the last-named situation.

A circuit assembly of this kind, as designed and practiced by this Applicant, partly in the form of monolithic integrated circuits designated TDB 7711 and TDB 7722, is presented on page 380 of SGS-THOMSON MICROELECTRONICS handbook "Telecom Data Book," June 1989.

SUMMARY OF THE INVENTION

In this application, a hook-off recognition function is performed by using a discrete component, resistive network for detecting the line transverse circuit. A circuit means internal to an SLIC integrated circuit is used to obtain the hook-off information from the line transverse current. The resistive network consists of six resistors which, for the circuit to operate properly, must be a high-accuracy (1 0/00) type and are, therefore, relatively expensive. The internal circuit means require special access terminals for connection to the resistive network.

It is a primary object of this invention to provide a circuit assembly with a circuit for recognizing a hook-off condition, which requires no high-accuracy resistors in order to recognize the hook-off condition during the ring step.

Another object is to provide a circuit assembly which can be advantageously implemented with monolithic IC devices having a reduced number of terminals.

These objects are achieved, according to the invention, by the circuit assembly generally set forth in the first of the claims appended hereto.

Detailed Description of the Invention

The invention will be better understood from the following detailed description of an embodiment thereof, given by way of example and not of limitation with reference to the accompanying drawings.

Figure 1:
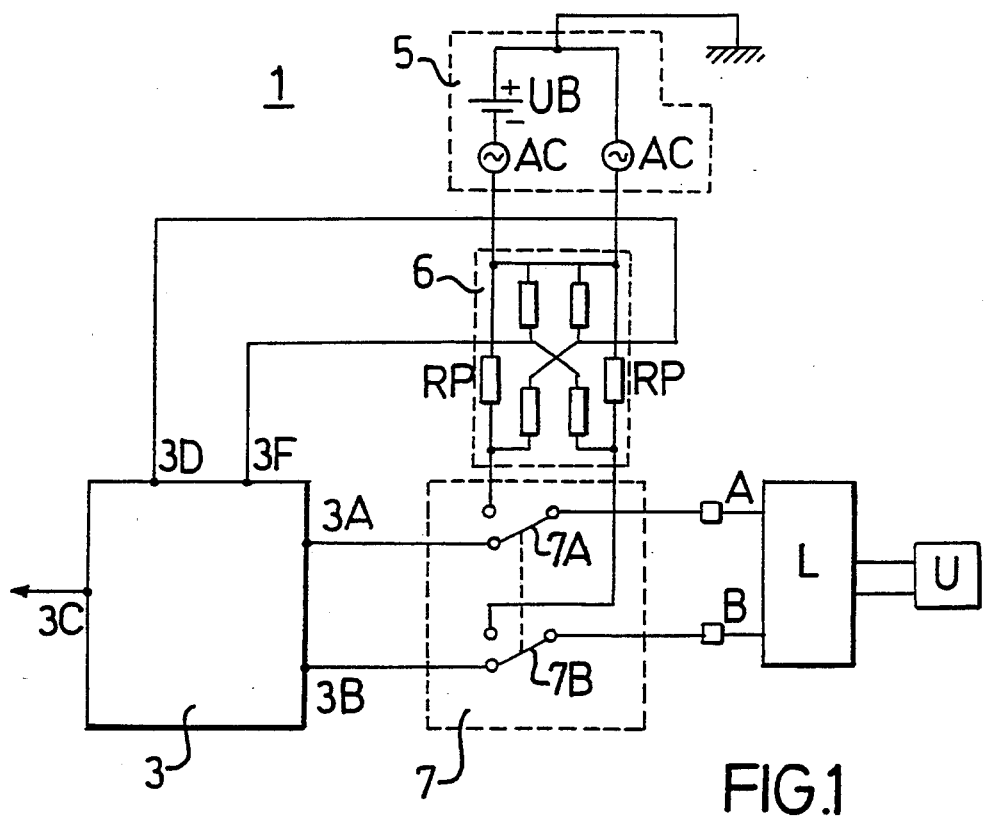
FIG. 1 illustrates diagramatically the above-mentioned conventional circuit assembly.

Shown in FIG. 1 is a telephone subscriber set U connected, via a line L, to a circuit assembly 1 of a telephone exchange. The assembly 1 comprises an interface circuit 3 between the telephone subscriber and the exchange control devices, basically consisting of two integrated circuits in the application shown in the aforementioned publication, and having two terminals 3A and 3B for connection to a line L, a terminal 3C for connection to the exchange control devices (not shown), and two more terminals 3D, 3F. Understandably, the interface circuit 3 would actually include a multiplicity of additional terminals, not shown in the diagram of FIG. 1 because immaterial to the function to be illustrated.

In addition, a supply circuit 5 has been shown which comprises a battery or direct voltage source UB having its positive pole connected to the ground connection of the circuit assembly, and a ring current generator in series with the battery UB, being in the form of two identical, push-pull alternate current sources shown at AC. Switch-over means, such as a relay and respective contacts, generally indicated at 7, are represented by two switches 7A and 7B arranged to connect terminals A and B, respectively, of the telephone line L to the output terminals 3A and 3B or the interface circuit 3 of the terminals of the supply circuit 5. The last-named connection is established through two resistors RP having the same resistive value, e.g., 300 Ohms, and forming the so-called bridge resistances which, as is known, are required for the coupling at the exchange between the supply circuit and the subscriber line.

Connected to the four terminals of the resistors RP is a group of four identical resistors connected together in a crossed configuration, as shown in the drawing, and having two output terminals formed by the crossed internal terminals of the resistors, which are connected to the terminals 3D and 3F of the interface circuit 3. The resistive network 6 formed of these four resistors and the two bridge resistors is effective to separate the so-called transverse current, i.e., the useful component of the line current, form the so-called longitudinal current, i.e., the component from noise and stray phenomena. As is known, the network operation is based on the fact that the transverse current flows in opposite directions through the two resistors RP, whereas the longitudinal current flows in the same direction through both of them.

As mentioned hereinabove, in order for that operation to take place in an adequately accurate manner, the six resistors in the network should be all carefully sorted out such that their coupling can be a highly accurate one. The transverse current information thus revealed is processed within the interface circuit 3 by circuit means adapted to obtain information about a possible hook-off condition of the subscriber set U with the line L connected to the supply circuit 5 as a call or ring signal is being sent. In principle, such circuit means will recognize the presence of a DC component in the transverse current and send a signal to the exchange control devices whereby the ring signal is disconnected and the line of the calling subscriber is put through that of the called subscriber.

Figure 2:
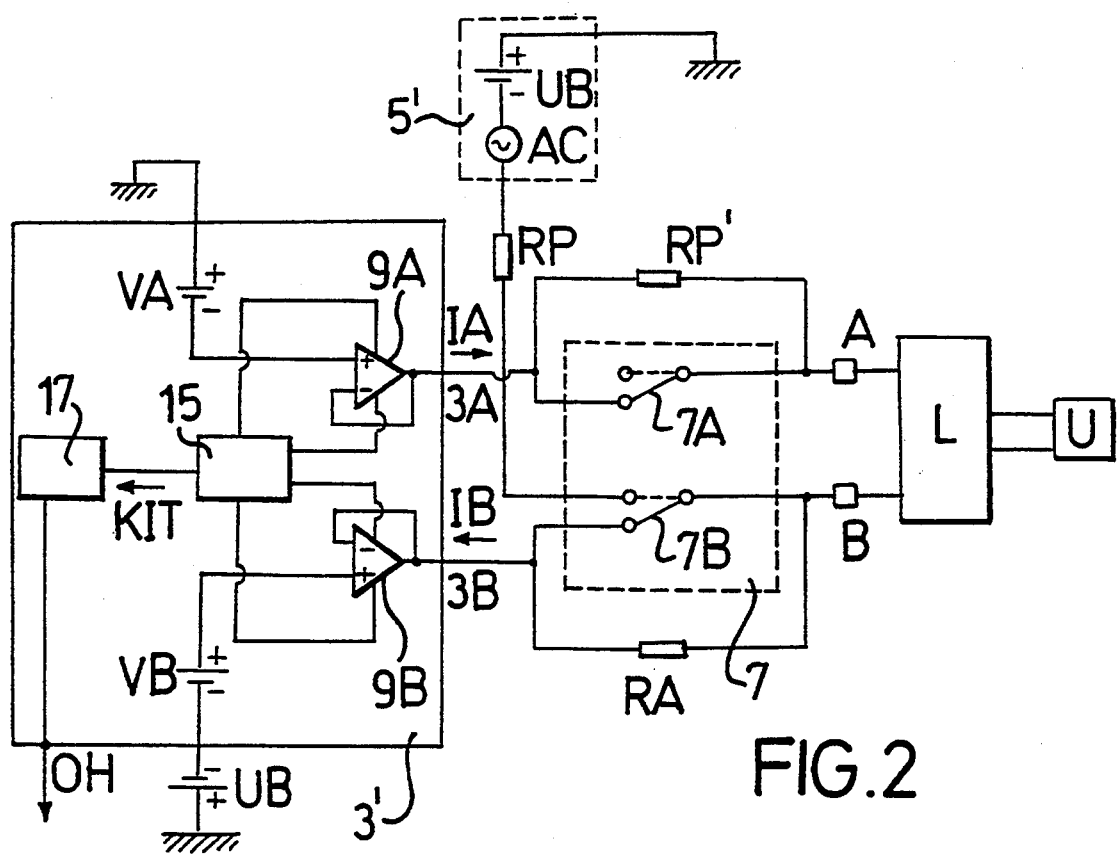
FIG. 2 illustrates diagramatically a circuit assembly according to the invention.

FIG. 2, where similar elements to those in FIG. 1 are denoted by just the same references and comparable ones by the same references primed, illustrates a circuit assembly according to the invention. As shown therein, the supply circuit 5' is a so-called unbalanced bell type, that is, one in which the ring generator consists of a single alternate current source AC' and is, from the functional standpoint, the equivalent of the conventional one with two push-pull sources. This construction for the power supply is preferable in that it affords a simpler circuitry, but in principle, the invention could also be practiced with a conventional balanced bell supply, as explained hereinafter with reference to FIG. 5.

One bridge resistor RP is connected between one contact of the switch 7B and the supply circuit 5'. Specifically, resistor RP is connected to the negative terminal of the battery UB through the source AC', in series, similarly to the circuit of FIG. 1. Another bridge resistor RP' is connected between the line terminal A and the output terminal 3A of an interface circuit 3'. An additional resistor RA is connected between the line terminal B and the output terminal 3B of the interface circuit 3'. The resistive value of resistor RA should be much higher than that of resistors RP, for example equal to 4 kOhms, for a reason to be explained.

The terminals 3A and 3B of circuit 3' are the output terminals of two bridge-connected operational amplifiers 9A and 9B in a buffer configuration. This construction of the output stage of the interface circuit 3' allows the line current flowing through the stage output terminals 3A and 3B to be detected. With that, moreover, the output terminal 3A will be, during the ring step, at a DC potential a few volts below ground level (typically 5 volts), and the output terminal 3B will be at a potential a few volts above battery UB voltage (typically 5 volts).

This ability to "sense" the line current and these voltage conditions of terminals 3A and 3B are utilized, in accordance with the invention, to perform the function of hook-off recognition during the ring step. It should be noted, in fact, that when the contacts 7A and 7B of the switch-over means 7 occupy the position indicated by dash lines in FIG. 2, the telephone line L is connected to the supply circuit 5' through the bridge resistors RP, RP', as prescribed. A difference from the conventional connection, such as that shown in FIG. 1, is that the bridge resistor RP' related to wire A in the line would be connected to a terminal which is at a slightly more negative potential than ground, but this is immaterial from a functional standpoint. As for the line current information, which in the conventional circuit of FIG. 1 was obtained through the resistive network 6 of six precision resistors, according to the invention, it is obtained directly from the final stage of the interface circuit 3' which is coupled, as shown, to the telephone line L even with the latter connected to the supply circuit 5, via the bridge resistor RP' and the additional resistor RA. It should be noted that the resistive value of the last-named resistor is sufficiently large not to significantly alter the desired level for the ring signal unused on the subscriber line, but still capable of supplying on terminal 3B the required line current information. The final stage of the interface circuit 3' may be illustrated schematically by two operational amplifiers, indicated at 9A and 9B in FIG. 2, which have their respective inverting inputs connected to the respective outputs 3A and 3B, and the non-inverting terminals biased to a voltage value VA slightly below ground and a voltage value VB slightly above battery UB voltage, respectively. A circuit block 15, e.g., of the kind described in Italian Patent Application No. 19983-A/85, filed on Mar. 20, 1985 by SGS Microelettronical S.p.A., is connected to the amplifiers 9A and 9B so as to obtain, from currents IA and IB as by add and subtract operations, a current kIT which is the mirror image of the transverse current IT. This is supplied to a detection circuit, indicated at 17 in FIG. 2, which obtains, from the image kIT of the transverse current IT, information of the presence of a DC component on the line current, and accordingly, detects any hook-offs and sends a corresponding signal (OH) to the exchange control devices.

It should also be noted that the resistor RA is not strictly required. In fact, with ring voltage values below 60 volts RMS, or, more generally, with any value of the ring voltage where high-precision sensing circuits are employed, it is not necessary that current IB be other than zero, since the current IT information may be alternatively obtained from just current IA by virtue of the detection being carried out by performing the half-sum of currents IA and IB.

The hook-off detecting circuit 17 may be a conventional one, such as that disclosed in Italian Patent No.

Figure 3:
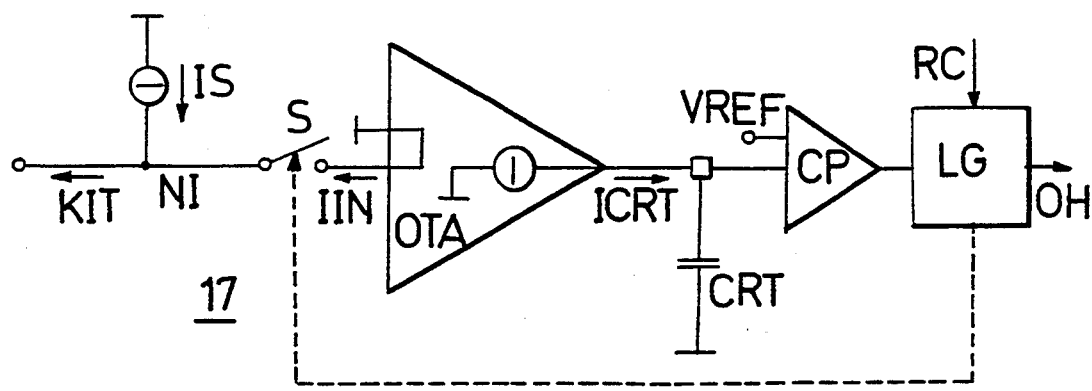
FIG. 3 is a diagram showing a circuit for recognizing hook-offs during the ring step which utilizes the principles of this invention.

1,212,838 to this Applicant, but could be advantageously configured as shown diagramatically in FIG. 3.

Figure 4:
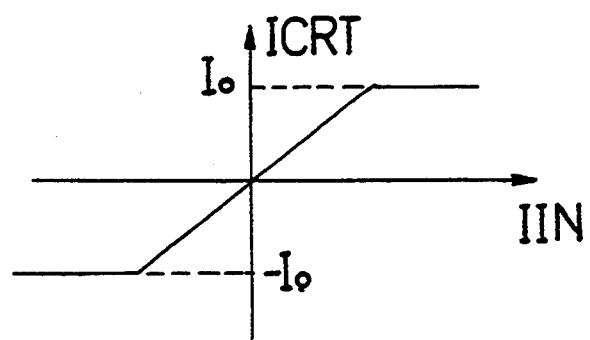
FIG. 4 illustrates the current transfer characteristic of a stage of the circuit in FIG. 3.

A logic circuit LG will receive, from the exchange control devices, a ring command signal RC and, as a result, cause a switch S, in series with the input of a transconductance operational amplifier OTA, to close. The current kIT, being the image of the line transverse current, is compared within input node NI to a threshold current IS having a predetermined value, to thereby prevent spurious hook-off recognitions due to noise on the line. If kIT > IS, a current IIN=kIT-IS will flow through a capacitor CRT cascade connected to the output of the amplifier OTA. The latter has a transfer characteristic of the kind illustrated by FIG. 4, that is, outputs a current ICRT which is proportional to the input current IIN, for values of this current falling between two given threshold values, and maintained constant at a positive or negative value Io as the input current varies, upon attaining such values.

Prior to hooking off, the mean value of current kIT would be less than the threshold current IS, and accordingly, the capacitor CRT left in the discharged state. Upon hooking off, due to the direct current which overlaps the ring alternate current, the mean value of kIT will exceed the threshold current IS, and the capacitor CRT become charged. The output of the circuit OTA is connected to the input of a comparator CP which has another input at a predetermined reference voltage VREF and its output connected to the logic circuit LG. On the voltage across the capacitor CRT exceeding the value of the reference voltage VREF, the comparator CP will send a signal to the logic circuit LG, which transmits a hook-off condition signal OH to the exchange control devices.

Figure 5:
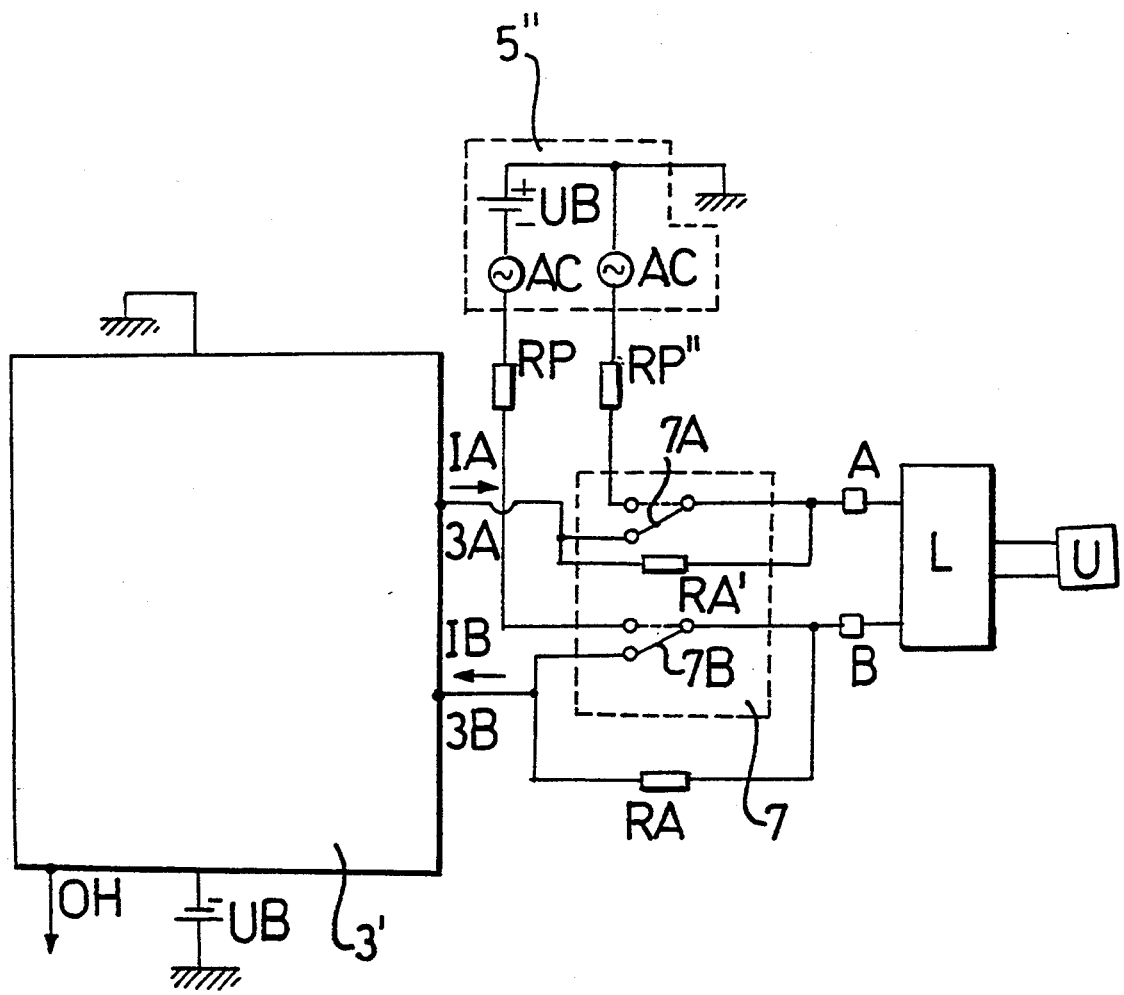
FIG. 5 shows in diagrammatic form a modified embodiment of the circuit assembly according to the invention.

Shown in FIG. 5, where similar elements to those in FIG. 2 are denoted by the same references, is a circuit assembly according to the invention, wherein the ring signal is supplied by two identical, push-pull AC sources being both designated AC. This circuit differs from the one shown in FIG. 2 in that a bridge resistor, designated RP", relating to the line terminal A, is connected between the supply circuit 5" and contact 7A, as was the case with the conventional circuit in FIG. 1. Another difference is that a second resistor RA', having the same resistive value as RA, is connected between the terminal A and the output 3A of circuit 3'. Thus, in this embodiment, the line current information is supplied through the two resistors RA and RA', and the above-described characteristic of circuit 3' is utilized whereby the terminals 3A and 3B are, during the ring step, at voltages close to ground and negative battery pole levels, respectively. Of course, in this embodiment of the inventive circuit, the resistors RA and RA' are both required at all times.

It will be readily appreciated from the foregoing that the circuit assembly of this invention fully achieves its objects. In fact, for recognizing the hook-off condition during the ring step, it requires no discrete high-precision resistors to detect the line current, since it utilizes current information already present on the interface circuit, and hence, no dedicated electrical connections between external components and the interface circuit. Thus, the latter can be advantageously integrated with a reduced number of terminals. The few additional discrete components involved, which as explained are not invariably necessary, are no critical values, and form, therefore, low-cost components.

We claim:

1. A telephone circuit assembly with a circuit for recognizing a hook-off condition during a ring step, comprising an interface circuit connected between first and second exchange control devices and a telephone subscriber line having terminals;

a supply circuit including a DC voltage source having two terminals and a ring AC generator in series with each other;

a switch-over means effective, under control by the exchange control devices, to alternatively connect the telephone subscriber line to the interface circuit or to the supply circuit;

two resistive members having substantially the same resistive value and being each connected serially between one of the telephone subscriber line terminals and one of the DC voltage source terminals, when the telephone subscriber line is connected to the supply circuit by the switch-over means; and a processing circuit means responsive to current on the telephone subscriber line and effective to isolate a useful signal component from said current, recognize any DC component indicative of the hook-off condition in the useful signal component during the ring step, and send upon recognition a signal to the exchange control devices;

the interface circuit comprising a pair of amplifiers connected in a bridge configuration between the terminals of the DC voltage source and having respective outputs connected each to a terminal of the telephone subscriber line upon the switch-over means connecting the telephone subscriber line to the interface circuit, and a current detecting means associated with said amplifiers to detect output current from the amplifiers and produce a current proportional to the useful signal component of the current on the telephone subscriber line;

the processing circuit means being incorporated into the interface circuit, Such that it includes the current detecting means associated with the amplifiers, and is effective to perform a half-sum of the output currents from the amplifiers as detected by the current detecting means; and one of the resistive means being connected permanently between the first telephone line terminal and the output of a first one of the interface circuit amplifiers, thereby said connection to the respective terminal of the DC voltage source occurring through said first amplifier.

2. A circuit assembly according to claim 1, further comprising an additional resistive member, having a much higher resistive value than said two resistive members and being connected between the first telephone subscriber line terminal and the output of a second one of the interface circuit amplifiers.

3. The telephone circuit assembly of claim 1 wherein the processing circuit means comprises a circuit having a first input terminal adapted to receive said current proportional to the useful signal component of the telephone line current, a second input terminal connected to the exchange control devices for receiving a ring command signal therefrom, and an output terminal connected to the exchange devices to supply them said signal of recognition of the DC component during the ring step, said circuit comprising a threshold current source, a current comparator having an output and input-wise connected to the first input terminal and the threshold current source, a transconductance operational amplifier input-wise connected to the output of the current comparator through a controlled switch means and output-wise to a charge storage means and a first input terminal of a voltage comparator, said voltage comparator having a second input connected to a reference voltage source and an output connected to an input of a logic circuit which is connected to said second input terminal and said output terminal of the circuit, said logic circuit also having an output terminal connected to the controlled switch means to control it to close upon receiving a command signal on said second input terminal thereof.

4. A telephone circuit assembly with a circuit for recognizing a hook-off condition during a ring step, comprising
- an interface circuit connected between exchange control devices and a telephone subscriber line having terminals;
- a supply circuit including a DC voltage source having two terminals and a ring AC generator in series with each other, said ring generator comprising two identical push-pull sources;
- a switch-over means effective, under control by the exchange control devices, to alternatively connect the telephone subscriber line to the interface circuit or to the supply circuit;
- two resistive means having substantially the same resistive value and being each connected serially between one of the telephone subscriber line terminals and one of the DC voltage source terminals, when the telephone subscriber line is connected to the supply circuit by the switch-over means; and
- a processing circuit means responsive to current on the telephone subscriber line and effective to isolate a useful signal component from said current, recognize any DC component indicative of the hook-off condition in the useful signal component during the ring step, and send upon recognition a signal to the exchange control devices;
- the interface circuit comprising a pair of amplifiers connected in a bridge configuration between the terminals of the DC voltage source and having respective outputs connected each to a terminal of the telephone subscriber line upon the switch-over means connecting the telephone subscriber line to the interface circuit, and a current detecting means associated with said amplifiers to detect output current from the amplifiers and produce a current proportional to the useful signal component of the current on the telephone subscriber line;
- the processing circuit means being incorporated into the interface circuit, such that it includes the current detecting means associated with the amplifiers; and
- two additional resistive means, substantially identical to each other, having much higher resistive values than that of said two resistive means and being individually connected between one of the telephone subscriber line terminals and the output terminal of one of the interface circuit amplifiers.

5. The telephone circuit assembly of claim 4 wherein the processing circuit means comprises a circuit having a first input terminal adapted to receive said current proportional to the useful signal component of the telephone line current, a second input terminal connected to the exchange control devices for receiving a ring command signal therefrom, and an output terminal connected to the exchange devices to supply them said signal of recognition of the DC component during the ring step, said circuit comprising a threshold current source, a current comparator having an output and input-wise connected to the first input terminal and the threshold current source, a transconductance operational amplifier input-wise connected to the output of the current comparator through a controlled switch means and output-wise to a charge storage means and a first input terminal of a voltage comparator, said voltage comparator having a second input connected to a reference voltage source and an output connected to an input of a logic circuit which is connected to said second input terminal and said output terminal of the circuit, said logic circuit also having an output terminal connected to the controlled switch means to control it to close upon receiving a command signal on said second input terminal thereof.

6. A telephone circuit assembly with a circuit for recognizing a hook-off condition during a ring step, comprising:
- a supply circuit including a DC voltage source;
- an interface circuit connected to a telephone subscriber line having first and second terminals;
- a switch-over means effective to alternatively connect the telephone subscriber line to the interface circuit or to the supply circuit;
- first and second resistive members having substantially the same resistive value, the first resistance member connected serially between the first telephone subscriber line terminal and the DC voltage source and the second resistance member connected serially between the second telephone subscriber line terminal and the interface circuit, when the telephone subscriber line is connected to the supply circuit by the switch-over means; and
- a processing circuit responsive to current on the telephone subscriber line and effective to isolate a useful signal component from said current, produce a current proportional to the useful signal component, and recognize a DC component indicative of the hook-off condition in the current during the ring step and output a signal indicative of recognition.

7. The circuit assembly of claim 6, further comprising a third resistive member, having a much higher resistive value than the first and second resistive members and being connected between the first telephone subscriber line terminal and the interface circuit.

8. The circuit assembly of claim 6 herein the processing circuit is incorporated into the interface circuit.

9. The circuit assembly of claim 8 wherein the processing circuit further includes a pair of amplifiers, one of which is connected to the second resistive member when the telephone subscriber line is connected to the interface circuit, and a first detection circuit that detects output current from the amplifiers and produces the current proportional to the useful signal component of the telephone subscriber line.

10. The telephone circuit assembly of claim 8 wherein the processing circuit includes a second detection circuit having a first input terminal that receives said current proportional to the useful signal component of the telephone line current, a threshold current source, and a current comparation input-wise connected to the first input terminal and threshold current source and having an output indicative of a difference between the threshold current and the useful signal of the telephone line current.

11. The telephone circuit assembly of claim 10 wherein the second detection circuit further includes a second input terminal that receives a ring command signal and an output terminal that supplies the signal of recognition of the direct current during the ring step.

12. The telephone circuit assembly of claim 11 wherein the second detection circuit further includes a transconductance operational amplifier input-wise connected to the output of the current comparator through a controlled switch means and output-wise to a capacitor and a first input terminal of a voltage comparator, said voltage comparator having a second input connected to a reference voltage source and an output connected to an input of a logic circuit which is connected to said second input terminal and said output terminal of the circuit, said logic circuit also having an output terminal connected to the controlled switch means to control it to close upon receiving a ring command signal on said second input terminal thereof.

13. The telephone circuit assembly of claim 6 wherein the supply circuit connects the interface circuit with the second resistive member.

14. The circuit assembly of claim 13, further including a third resistive member, having a much higher resistive value than the first and second resistive members and being connected between the first telephone subscriber line terminal and the interface circuit.

15. The circuit assembly of claim 13 wherein the processing circuit is incorporated into the interface circuit.

16. The circuit assembly of claim 15 wherein the processing circuit further includes a pair of amplifiers, one of which is connected to the second resistive member when the telephone subscriber line is connected to the interface circuit, and a first detection circuit that detects output current from the amplifiers and produces the current proportional to the useful signal component of the telephone subscriber line.

17. The telephone circuit assembly of claim 16 wherein the processing circuit includes a second detection circuit having a first input terminal that receives said current proportional to the useful signal component of the telephone line current, a threshold current source, and a current comparator input-wise connected to the first input terminal and the threshold current source and having an output indicative of a difference between the threshold current and the useful signal of the telephone line current.

18. The telephone circuit assembly of claim 17 wherein the second detection circuit further includes a second input terminal that receives a ring command signal and an output terminal that supplies the signal of recognition of the direct current during the ring step.

19. The telephone circuit assembly of claim 18 wherein the second detection circuit further includes a transconductance operational amplifier input-wise connected to the output of the current comparator through a controlled switch means and output-wise to a capacitor and a first input terminal of a voltage comparator, said voltage comparator having a second input connected to a reference voltage source and output connected to an input of a logic circuit which is connected to said second input terminal and said output terminal of the circuit, said logic circuit also having an output terminal connected to the controlled switch means to control it to close upon receiving a ring command signal on said second input terminal thereof.

20. The telephone circuit assembly of claim 7 further including a fourth resistive member, substantially identical to the third resistive member and being connected between the second telephone subscriber line terminal and the interface circuit.

21. A telephone circuit assembly with a circuit for recognizing a hook-off condition during a ring step, comprising:
   a supply circuit including a DC voltage source;
   a telephone subscriber line having first and second terminals
   an interface circuit having first and second terminals;
   a switch effective to alternatively connect the telephone subscriber line to the interface circuit or to the supply circuit;
   a first resistive member connected serially between the first telephone subscriber line terminal and the DC voltage source when the telephone subscriber line is connected to the supply circuit by the switch;
   a second resistive member permanently connected serially between the second telephone subscriber line terminal and the interface circuit; and
   a processing circuit responsive to current on the telephone subscriber line and effective to isolate a useful signal component from said current, produce a current proportional to the useful signal component, and recognize a DC component indicative of the hook-off condition in the current during the ring step and output a signal indicative of recognition.

22. The telephone circuit assembly of claim 21 wherein the first and second resistive members have substantially the same resistance value.

23. The telephone circuit assembly of claim 22, further comprising:
   a third resistive member having a much higher resistance value than the first and second resistive members and being permanently connected between the first telephone subscriber line and the interface circuit.

24. The telephone circuit assembly of claim 21, further comprising:
   a third resistive member having substantially the same resistance value as the first resistive member and being connected serially between the second telephone subscriber line terminal and the DC voltage source when the telephone subscriber line is connected to the supply circuit by the switch.

25. The telephone circuit assembly of claim 21, further comprising:
   a fourth resistive member having substantially the same resistance value as the second resistive member and being permanently connected serially between the first telephone subscriber line terminal and the interface circuit.

* * * * *

UNITED STATES PATENT AND TRADEMARK OFFICE
CERTIFICATE OF CORRECTION

PATENT NO. : 5,402,484

DATED : March 28, 1995

INVENTOR(S) : Marco Siligoni and Vanni Saviotti

It is certified that error appears in the above-identified patent and that said Letters Patent is hereby corrected as shown below:

In column 8, claim 8, line 49, please delete "herein" and substitute therefor --wherein--.

In column 8, claim 10, line 64, please delete "comparation" and substitute therefor --comparator--.

In column 8, claim 10, line 65, after "and" and before "threshold", please insert --the--.

Signed and Sealed this

Nineteenth Day of September, 1995

Attest:

BRUCE LEHMAN

*Attesting Officer*      *Commissioner of Patents and Trademarks*